United States Patent
Oommen

(10) Patent No.: US 8,949,859 B2
(45) Date of Patent: Feb. 3, 2015

(54) EVENT-DRIVEN APPLICATION SYSTEMS AND METHODS

(71) Applicant: Alcatel-Lucent Canada Inc., Ottawa (CA)

(72) Inventor: Saju Oommen, Ottawa (CA)

(73) Assignee: Alcatel Lucent, Boulogne-Billancourt (FR)

( * ) Notice: Subject to any disclaimer, the term of this patent is extended or adjusted under 35 U.S.C. 154(b) by 43 days.

(21) Appl. No.: 13/922,973

(22) Filed: Jun. 20, 2013

(65) Prior Publication Data

US 2014/0380337 A1    Dec. 25, 2014

(51) Int. Cl.
*G06F 13/00* (2006.01)
*G06F 9/54* (2006.01)

(52) U.S. Cl.
CPC ........................................ *G06F 9/542* (2013.01)
USPC .......................................................... 719/318

(58) Field of Classification Search
CPC ....................................................... G06F 9/542
USPC .......................................................... 719/318
See application file for complete search history.

(56) References Cited

U.S. PATENT DOCUMENTS 7,134,072 B1 * 11/2006 Lovett et al. ................... 715/234
2005/0114187 A1 * 5/2005 Adachi et al. ..................... 705/7

* cited by examiner

*Primary Examiner* — Andy Ho
(74) *Attorney, Agent, or Firm* — McCormick, Paulding & Huber LLP

(57) ABSTRACT

An event-driven application system and method includes an activity-function engine in communication with an event-driven application. The activity-function engine includes an event matching list having a plurality of input-event to activity-function mappings. The event-driven application includes at least one programmable object having at least one activity-function. The activity-function engine is configured to receive an input-event from the application, to match the input-event to the at least one activity-function based on the plurality of input-event to activity-function mappings, and to execute the at least one activity-function.

20 Claims, 3 Drawing Sheets

EVENT-DRIVEN APPLICATION SYSTEMS AND METHODS

FIELD OF THE INVENTION

The present invention relates to event-driven applications.

BACKGROUND OF THE INVENTION

Event-driven applications transition internal programmable objects through various supported states based on the triggering of program events. In order to handle multiple input-events acting on multiple objects, each with multiple states, event-driven applications often incorporate multiple conditional checks and/or contain several layers of filtering before an input-event is handled by a specific programmable object in a specific state. The complexities associated with handling multiple input-events and multiple programmable objects, each with multiple states, make event-driven applications difficult to maintain and results in program code that is often application specific, with the bulk of the code written to do event processing/routing through the software components. Such applications are maintenance-heavy, difficult to enhance and cannot be reused to build additional event-driven applications.

SUMMARY

According to an embodiment, a computerized system includes an activity-function engine configured to execute on at least one processor. The activity-function engine includes an event-matching list having a plurality of input-event to activity-function mappings. The computerized system also include an application configured to be stored in memory and executed by the at least one processor. The application includes at least one programmable object having at least one activity-function. The activity-function engine is configured to receive an input-event from the application, to match the input-event to the at least one activity-function based on the plurality of input-event to activity-function mappings, and to execute the at least one activity-function.

According to an embodiment, the activity-function engine is configured to execute multiple activity-functions matching the input-event in a defined execution order.

According to an embodiment, the at least one activity-function is configured to return a feedback code.

According to an embodiment, the feedback code may be a SUCCESS code when the at least one activity-function successfully executes. The feedback code may also be a FAIL code when the at least one activity-function encounters an error. The feedback code may be a BREAK code when subsequent activity-functions matching the input-event are not to be executed. The feedback code may also be a RERUN code when the activity-function engine is to process the input-event an additional time. The feedback code may also be a PARTIAL-SUCCESS code when at least one activity-function successfully executes, but at least one additional activity-function could not be executed due to unavailability of a programmable object for the additional activity function. The feedback code may also be a NO-MATCH code if the at least one input event does not match any activity functions.

According to an embodiment, the input-event includes a unique event identifier.

According to an embodiment, the unique event identifier comprises an event type identifier, an object identifier, and an event identifier. The event type identifier may define a category of input-event. The object identifier may define a specific programmable object of the at least one programmable object. The event identifier may define a specific input-event.

According to an embodiment, the unique event identifier may be in packed form.

According to an embodiment, a computerized method includes the step of receiving, at an activity-function engine, an input-event from an application. The method further includes the step of matching, at the activity-function engine, the input-event to at least one activity-function of at least one programmable object of the application based on an event matching list comprising a plurality of input-event to activity-function mappings. The method also includes the step of executing the at least one activity-function.

According to an embodiment, executing the at least one activity-function may include executing the at least one activity-function in a defined execution order.

According to an embodiment, the computerized method may also include the step of returning a feedback code by the at least one activity-function.

According to an embodiment, the feedback code may be a SUCCESS code when the at least one activity-function successfully executes. The feedback code may also be a FAIL code when the at least one activity-function encounters an error. The feedback code may be a BREAK code when subsequent activity-functions matching the input-event are not to be executed. The feedback code may also be a RERUN code when the activity-function is to process the input-event an additional time. The feedback code may also be a PARTIAL-SUCCESS code when at least one activity-function successfully executes, but at least one additional activity-function could not be executed due to unavailability of a programmable object for the additional activity function. The feedback code may also be a NO-MATCH code if the at least one input event does not match any activity functions.

According to an embodiment, matching, at the activity-function engine, the input-event to at least one activity-function of at least one programmable object of the application may be based on a unique event identifier of the input-event.

According to an embodiment, the unique event identifier of the input-event may include an event type identifier, an object identifier, and an event identifier. The event type identifier may define a category of input-event. The object identifier may define a specific programmable object of the at least one programmable object. The event identifier may define the input-event.

According to an embodiment, the unique event identifier of the input-event may be in packed form.

According to an embodiment, a non-transitory, tangible computer-readable medium stores instructions adapted to be executed by a computer processor to perform a method that includes the step of receiving, at an activity-function engine, an input-event from an application. The method further includes the step of matching, at the activity-function engine, the input-event to at least one activity-function of at least one programmable object of the application based on an event matching list comprising a plurality of input-event to activity-function mappings. The method also includes the step of executing the at least one activity-function.

According to an embodiment, executing the at least one activity-function may include executing the at least one activity-function in a defined execution order.

According to an embodiment, the method may also include the step of returning a feedback code by the at least one activity-function.

According to an embodiment, the feedback code may be a SUCCESS code when the at least one activity-function successfully executes. The feedback code may also be a FAIL code when the at least one activity-function encounters an error. The feedback code may be a BREAK code when subsequent activity-functions matching the input-event are not to be executed. The feedback code may also be a RERUN code when the activity-function is to process the input-event an additional time. The feedback code may also be a PARTIAL-SUCCESS code when at least one activity-function successfully executes, but at least one additional activity-function could not be executed due to unavailability of a programmable object for the additional activity function. The feedback code may also be a NO-MATCH code if the at least one input event does not match any activity functions.

According to an embodiment, matching, at the activity-function engine, the input-event to at least one activity-function of at least one programmable object of the application may be based on a unique event identifier of the input-event.

According to an embodiment, the unique event identifier of the input-event may include an event type identifier, an object identifier, and an event identifier. The event type identifier may define a category of input-event. The object identifier may define a specific programmable object of the at least one programmable object. The event identifier may define the input-event.

These and other embodiments will become apparent in light of the following detailed description herein, with reference to the accompanying drawings.

DETAILED DESCRIPTION

Figure 1:
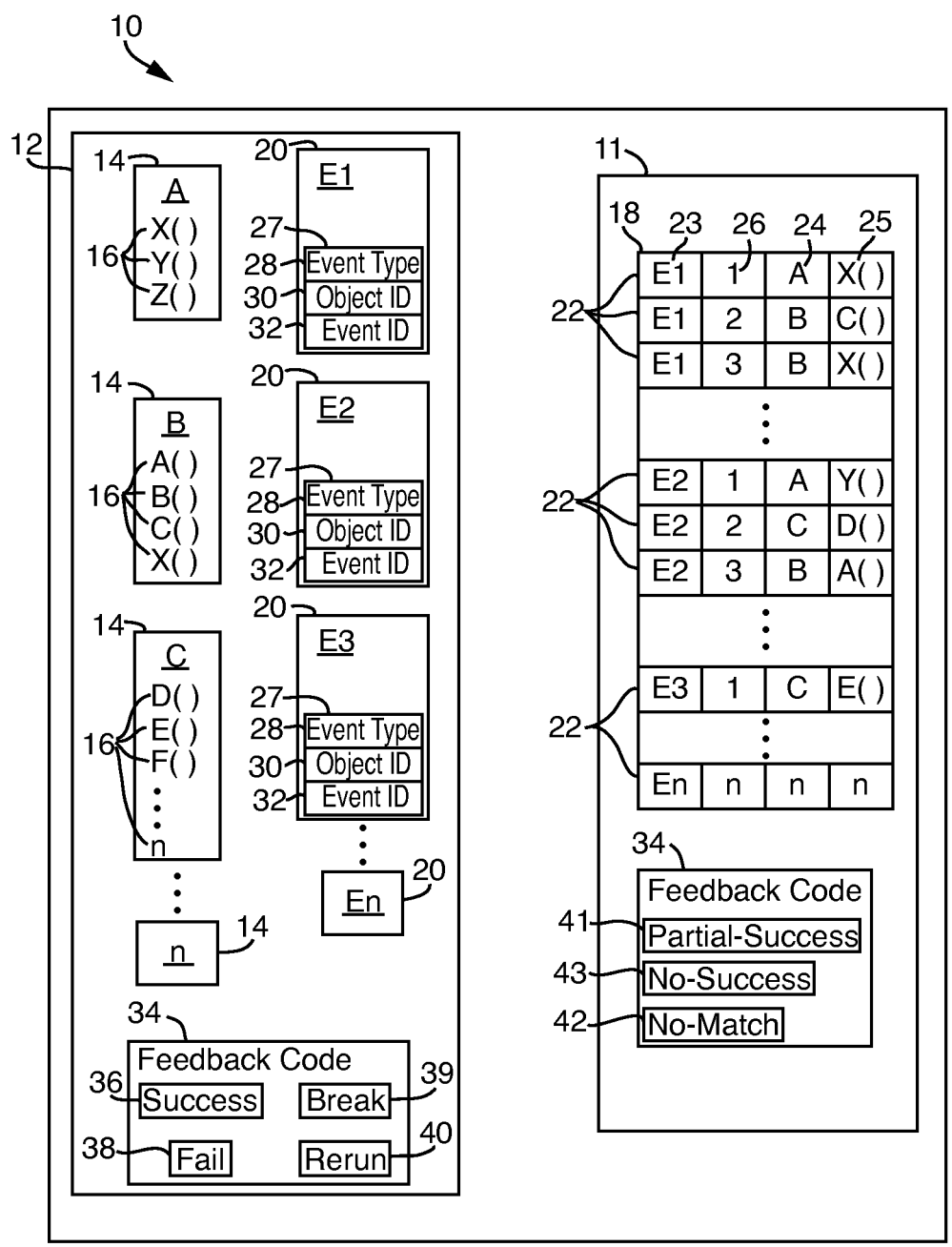
FIG. 1 is a schematic diagram of a computerized system according to an embodiment.

Referring to FIG. 1, an embodiment of a computerized system 10 includes an activity function engine 11 in communication with an event-driven application 12. The event-driven application 12 is configured to be stored in memory and executed by at least one processor of the computerized system 10. The event-driven application 12 includes at least one programmable object 14 that includes at least one activity-function 16. In embodiments, the at least one activity-function 16 may be a member method of the at least one programmable object 14. In other embodiments, the at least one activity-function 16 may be a non-member function such as a static function.

The activity-function engine 11 is configured to execute on the at least one processor of the computerized system 10 and includes an event-matching list 18. The activity function engine 11 is configured to execute at least one activity-function 16 of the at least one programmable object 14 of the event-driven application 12 in response to at least one input-event 20. In embodiments, the input-events 20 trigger transitions between various states of programmable objects 14. These transitions are governed by rules that consider a source and content of the input-event 20 and the present state and availability of one or more programmable objects 14.

The activity-function engine 11 may reside inside or outside a main body of the event-driven application 12, in a separate file or application, or in separate programming library. The event-matching list 18 includes a plurality of input-event to activity-function mappings 22. Each input-event to activity-function mapping 22 of the plurality of input-event to activity-function mappings 22 may include an event reference 23 to the at least one input-event 20 that can be triggered by the event-driven application 12, an object reference 24 to a programmable object 14 of the event-driven application 12, and an activity-function reference 25 to at least one activity-function 16 of the programmable object 14. The object references 24 are references to the real programmable objects 14 of the event-driven application 12, as should be understood by those skilled in the art. For example, in an embodiment, the object references 24 may, themselves be object pointers in the appropriate programming language, such as C++ of the like. In other embodiments, the activity-function engine 11 may include a separate object-mapping table (not shown) where the object references 24, such as alpha-numeric constants A, B, C, ..., n, are mapped to object pointers in the appropriate programming language, such as C++ of the like. The object-mapping table (not shown) may be dynamic, such that the table grows and/or shrinks in length as the event-driven application 12 registers and/or de-registers programmable objects 14 with the activity-function engine 11.

In an embodiment, each input-event to activity-function mapping 22 may also include an execution order 26 defining an order in which the activity-functions 16 for matching input-events 20 are to be executed by the event-driven application 12. The defined execution order 26 may be incorporated as a member variable, property, or field of the input-event to activity-function mappings 22. The input-event to activity-function mappings 22 within the event-matching list 18 may be statically written in advance, or, in embodiments, the input-event to activity-function mappings 22 may be dynamically written by the event-driven application 12 during execution. In some embodiments, the input-event to activity-function mappings 22 may also be added or removed from the event-matching list 18 in grouped lists.

In an embodiment, the at least one input-event 20 may have a unique event identifier 27 providing specific information regarding the input-event 20. For example, the unique event identifier 27 may include an event type identifier 28, an object identifier 30, and an event identifier 32. The event type identifier 28 defines a category of the input-event 20 such as an enumerated type, an instantiated class, an abstract class, a numerically, alphabetically, or alphanumerically designated category or the like. The object identifier 30 may define a specific programmable object, such as A, B or C, of the at least one programmable object 14. The event identifier 32 may define the specific input-event 20. In an embodiment, the unique event identifier 27 may be in packed form with bits defining the event type identifier 28, object identifier 30 and event identifier 32 being aligned together to minimize the amount of memory required to store and process the unique event identifiers 27 by the at least one processor.

As discussed above, each input-event to activity-function mapping 22 may include an event reference 23 to the at least one input-event 20. For example, the event references 23 may correspond to the unique event identifiers 27 of the input-events 20 and may be in the form of Type.SourceObject.Event, where Type, SourceObject and Event correspond to the event type identifier 28, the object identifier 30, and the event identifier 32 of the unique event identifiers 27, respectively. This allows the input-event to activity-function mappings 22 to map specific input-events 20 to activity-functions 16, based on the unique event identifiers 27. In embodiments, the event references 23 may also include wild characters for one or more of the Type, SourceObject and/or Event so that only the non-wild characters of the event reference 23 need to correspond to the unique event identifier 27 to indicate a match in the input-event to activity-function mappings 22. For example, the event reference 23 may be *.*.eventID1, where * is the wild character, to indicate a match for any input-event 20 with an event identifier 32 of eventID1, regardless of the event type identifier 28 and the object identifier 30 of the unique event identifier 27 of the input-event 20. Similarly, the event references 23 in the input-event to activity-function mappings 22 may be of the form *.ObjectID1.*, to indicate wild characters for the event type identifier 28 and the event identifier 32, of the form TypeID3.*.*, to indicate wild characters for the object identifier 30 and the event identifier 32, or of the form *.*.* to indicate wild characters for all of the event type identifier 28, the object identifier 30, and the event identifier 32 (i.e. the activity-function 16 is to be executed for any input-event 20). Thus, the wild characters allow one input-event to activity-function mappings 22 to map multiple input-events 20 to activity-functions 16 of the event-driven application 12, based on the unique event identifiers 27.

The event-driven application 12 and the activity-function engine 11 may include feedback codes 34 for providing feedback on execution of the at least one activity-function 16 and on operation of the activity-function engine 11. The feedback codes 34 of the event-driven application 12 may include, for example, a SUCCESS code 36 for indicating successful execution of the at least one activity-function 16, a FAIL code 38 for indicating that the at least one activity-function 16 encountered an error during execution, a BREAK code 39 for indicating that subsequent matching activity-functions 16 for the matched input-event 20 are not to be executed, a RERUN code 40 for indicating that the activity-function engine 11 is to process the input-event 20 an additional time or any other similar feedback as should be understood by those skilled in the art. The feedback codes 34 of the activity-function engine 11 may be, for example a PARTIAL-SUCCESS code 41 for indicating that at least one activity-function 16 successfully executed, but at least one additional activity-function 16 could not be executed due to unavailability of the programmable object 14 for the additional activity function 16, a NO-MATCH code 42 for indicating that the activity-function engine 11 found no matches for the input-event 20 in the event-matching list 18, a NO-SUCCESS code 43 for indicating that no activity-functions 16 could be executed due to unavailability of the programmable objects 14 for the activity functions 16 or any other similar feedback as should be understood by those skilled in the art.

Figure 2:
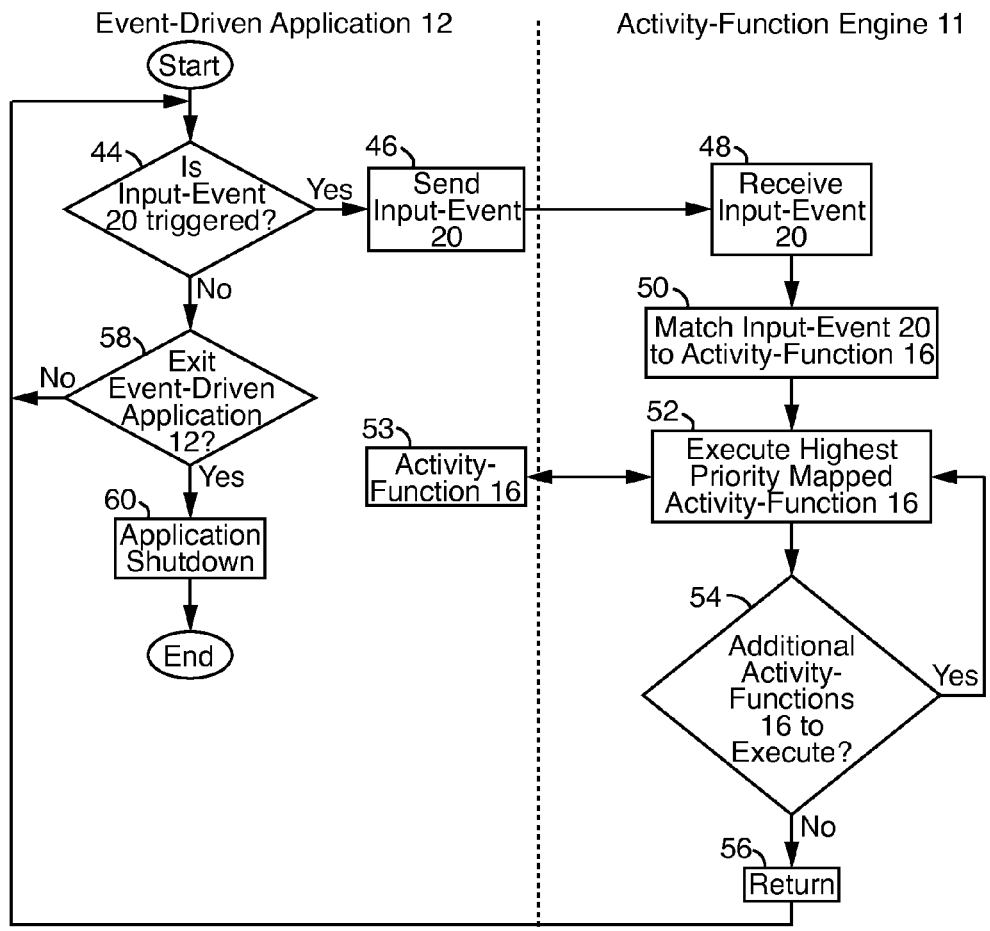
FIG. 2 is a flow chart depicting an embodiment for processing an input-event through the computerized system of FIG. 1.

Referring to FIG. 2, in operation, the event-driven application 12 is configured to trigger input-events 20 at step 44 and to send the input-event 20 to the activity function engine 11 at step 46. The activity-function engine 11 receives the at least one input-event 20 from the event-driven application 12 at step 48. At step 50, the activity-function engine 11 then matches the at least one input-event 20 to at least one activity-function 16 using the plurality of input-event to activity-function mappings 22, shown in FIG. 1.

Figure 3:
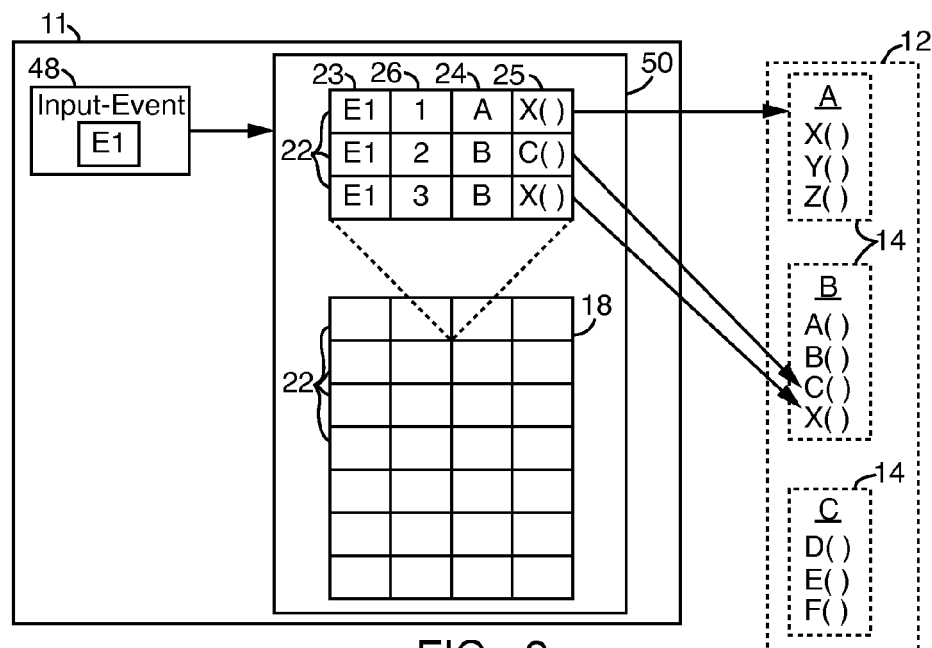
FIG. 3 is a flow chart depicting an embodiment for matching an input-event to at least one activity function in the computerized system of FIG. 1.

For example, referring to FIG. 3, the at least one input-event 20 triggered by the event-driven application 12 at step 44 and received by the activity-function engine 11 at step 48 may have the unique event identifier 27 corresponding to event E1. At step 50, the activity-function engine 11 compares the input-event 20 having the unique event identifier 27 corresponding to event E1 to the input-event to activity-function mappings 22 within the event matching list 18 to locate and match the input-event 20 to at least one activity-function 16 of the event-driven application 12. In the exemplary embodiment shown in FIG. 3, the activity-function engine 11 matches the event E1 to three activity functions, X( ) of programmable object A, C( ) of programmable object B, and X( ) of programmable object B. For example the activity-function engine 11 may match the event E1 by hashing event E1 and using the resulting hash to locate the corresponding input-event to activity-function mappings 22 within the event-matching list 18 as should be understood by those skilled in the art.

Referring back to FIG. 2, the activity-function engine 11 then invokes and executes, at step 52, the highest priority matching activity-function 16, as defined by the execution order 26, shown in FIG. 3. The activity-function 16 is implemented by the event-driven application 12 as shown at step 53. As discussed above, the activity-function engine 11 may implement the object-mapping table (not shown) discussed above to invoke the matched activity functions 16 on the respective programmable objects 14, shown in FIG. 1, once the event matching is completed. For example, in the exemplary embodiment shown in FIG. 3, the activity-function engine invokes and executes activity function X( ) of programmable object A of the application 12 first. Once the executing activity function 16 returns, the activity-function engine 11 determines whether or not there are additional matching activity functions 16 to execute at step 54. If there are additional matching activity functions 16 to execute, the activity function engine 11 returns to step 52 to invoke and execute the next highest priority matching activity-function 16, as defined by the execution order 26, shown in FIG. 3. For example, in the exemplary embodiment shown in FIG. 3, the activity-function engine invokes and executes activity function C( ) of programmable object B of the application 12 on the second pass through step 52 and invokes and executes activity function X( ) of programmable object B on the third pass through step 52. Thus, if there are three matching activity-functions 16 for the input-event 20, the activity-functions 16 are executing according to the execution order identifiers 26 as defined in the input-event to activity-function mappings 22. If the activity-function engine 11 determines that there are no additional matching activity functions 16 to execute at step 54, the activity-function engine returns to the event-driven application 12 at step 56.

If the event-driven application 12 triggers additional input-events 20 at step 44, the matching and execution process discussed above is repeated for the additional input-events 20. If additional input-events 20 are not triggered at step 44, it may be evaluated whether the event-driven application 12 should be exited at step 58 and, the event-driven application 12 may, optionally, be shutdown at step 60.

Figure 4:
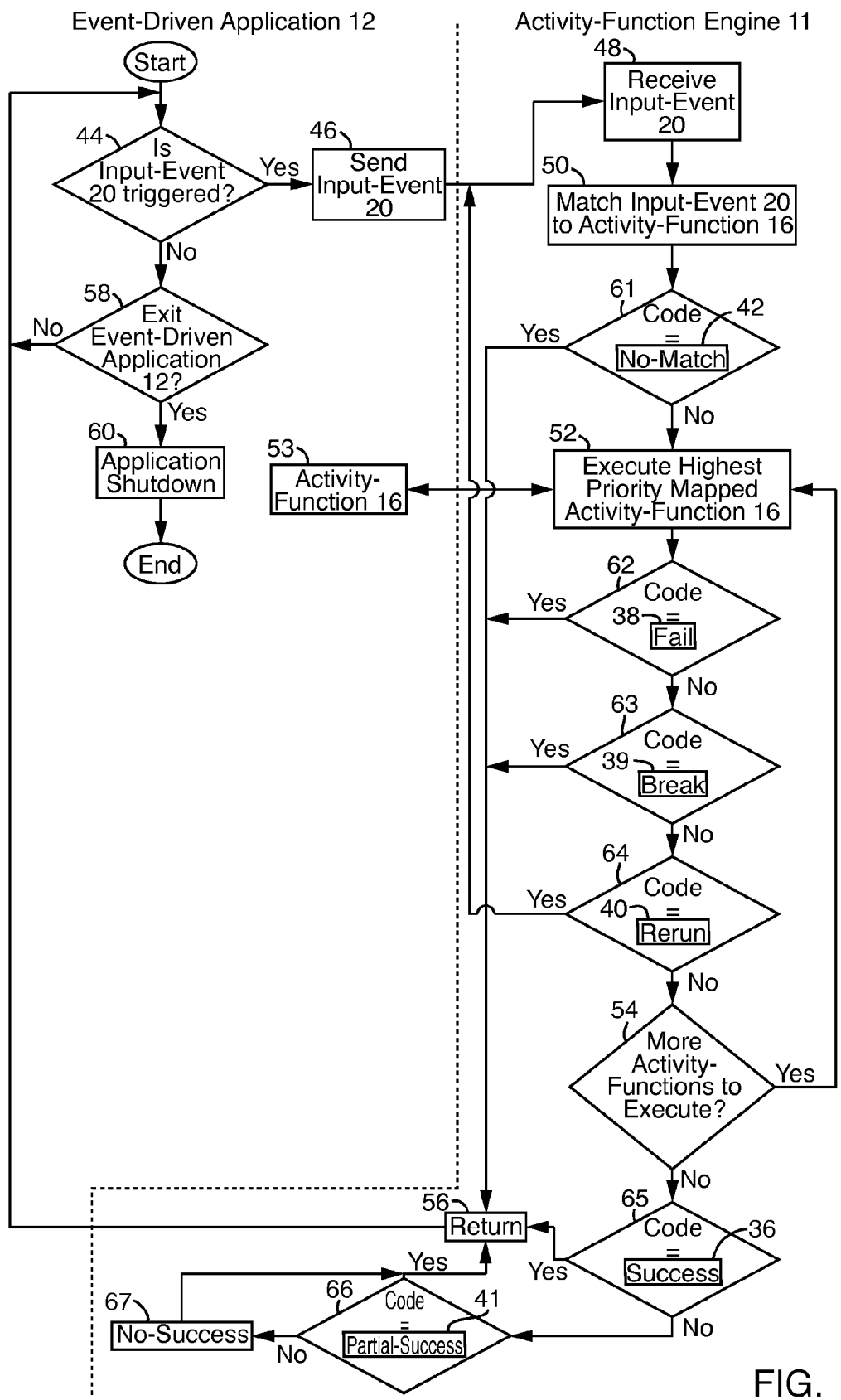
FIG. 4 is a flow chart depicting an embodiment for matching an input-event to at least one activity function in the computerized system of FIG. 1.

Referring to FIG. 4, wherein steps 44-60 are substantially the same as those discussed in connection with FIG. 2, as discussed above, the activity-function engine 11 and/or the event-driven application 12 may be configured to return one or more feedback codes 34, shown in FIG. 1, providing feedback on execution of the at least one activity-function 16 and/or the activity-function engine 11. For example, after comparing the input-event 20 to the plurality of input-event to activity-function mappings 22 at step 50, the activity-function engine may evaluate whether the NO-MATCH code 42 should be returned, at step 61, if no matches were found. After invoking and executing the matched activity-function 16 at step 52, the FAIL code 38 may be returned at step 62 if the activity-function 16 encountered an error during execution.

Additionally, a BREAK code 39 may be returned at step 63 when subsequent matching activity-functions 16 for the matched input-event 20 are not to be executed or, alternatively, a RERUN code 40 may be returned at step 64 indicating that the activity-function engine 11 is to process the input-event 20 an additional time. The FAIL code 38, BREAK code 39 and RERUN code 40 may be returned immediately by the activity-function engine 11, without processing successive matched activity-functions 16, upon receipt of a corresponding code from the executing activity-function 16. After all of the matched activity-functions 16 have been executed, i.e. the answer to step 54 is NO, the activity-function engine 11 may evaluate whether the SUCCESS code 36 should be returned at step 65 to indicate that all of the matched activity-functions 16 were successfully executed. If all of the matched activity-functions 16 were not successfully executed a PARTIAL-SUCCESS code 41 may be returned by the activity-function engine 11 at step 66. The PARTIAL-SUCCESS code 41 indicates that at least one activity-function 16 successfully executed, but at least one additional activity-function 16 could not be executed because the respective programmable object 14, shown in FIG. 1, was not found for the additional activity-function 16 that was not executed. At step 67, the activity-function engine 11 may return the NO-SUCCESS code 43 if none of the matched activity-functions 16 were successful executed because the respective programmable objects 14, shown in FIG. 1, could not be found for any of the matched activity-functions 16. The PARTIAL-SUCCESS code 41 and the NO-SUCCESS code 43 may be distinguished from the FAIL code 38 in that the FAIL code 38 is returned when the activity-function 16 executes and encounters an error, while the PARTIAL-SUCCESS code 41 and the NO-SUCCESS code 43 are reserved for situations where at least one activity-function 16 does not execute because the respective programmable object 14, shown in FIG. 1, is not found. As should be understood by those skilled in the art, various other feedback codes 34, shown in FIG. 1, may be implemented depending upon a desired execution and operation of the even-driven application 12 and activity-function engine 11.

The computerized system 10 has the necessary electronics, software, memory, storage, databases, firmware, logic/state machines, microprocessors, communication links, displays or other visual or audio user interfaces, printing devices, and any other input/output interfaces to perform the functions described herein and/or to achieve the results described herein. For example, the computerized system 10 may include at least one processor, system memory, including random access memory (RAM) and read-only memory (ROM), an input/output controller, and one or more data storage structures. All of these latter elements are in communication with the at least one processor to facilitate the operation of the computerized system 10 as discussed above. Suitable computer program code may be provided for executing numerous functions, including those discussed above in connection with the computerized system 10, activity-function engine 11 and application 12. The computer program code may also include program elements such as an operating system, a database management system and "device drivers" that allow the computerized system 10, application 12, and activity-function engine 11 to interface with computer peripheral devices (e.g., a video display, a keyboard, a computer mouse, etc.).

The at least one processor of the computerized system 10 may include one or more conventional microprocessors and one or more supplementary co-processors such as math co-processors or the like. Elements in communication with each other need not be continually signaling or transmitting to each other. On the contrary, such elements may transmit to each other as necessary, may refrain from exchanging data at certain times, and may cause several steps to be performed to establish a communication link therebetween.

The data storage structures such as memory discussed herein may comprise an appropriate combination of magnetic, optical and/or semiconductor memory, and may include, for example, RAM, ROM, flash drive, an optical disc such as a compact disc and/or a hard disk or drive. The data storage structures may store, for example, information required by the computerized system 10 and/or one or more programs (e.g., computer program code and/or a computer program product) adapted to direct the computerized system 10 to receive input-events 20 and execute corresponding activity functions 16 according to the various embodiments discussed herein. The programs may be stored, for example, in a compressed, an uncompiled and/or an encrypted format, and may include computer program code. The instructions of the computer program code may be read into a main memory of a processor from a computer-readable medium. While execution of sequences of instructions in the program causes the processor to perform the process steps described herein, hard-wired circuitry may be used in place of, or in combination with, software instructions for implementation of the processes of the present invention. Thus, embodiments of the present invention are not limited to any specific combination of hardware and software.

The program may also be implemented in programmable hardware devices such as field programmable gate arrays, programmable array logic, programmable logic devices or the like. Programs may also be implemented in software for execution by various types of computer processors. A program of executable code may, for instance, comprise one or more physical or logical blocks of computer instructions, which may, for instance, be organized as an object, procedure, process or function. Nevertheless, the executables of an identified program need not be physically located together, but may comprise separate instructions stored in different locations which, when joined logically together, comprise the program and achieve the stated purpose for the programs such as preserving privacy by executing the plurality of random operations. In an embodiment, an application of executable code may be a compilation of many instructions, and may even be distributed over several different code partitions or segments, among different programs, and across several devices.

The term "computer-readable medium" as used herein refers to any medium that provides or participates in providing instructions to at least one processor of the computerized system 10 (or any other processor of a device described herein) for execution. Such a medium may take many forms, including but not limited to, non-volatile media and volatile media. Non-volatile media include, for example, optical, magnetic, or opto-magnetic disks, such as memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, a RAM, a PROM, an EPROM or EEPROM (electronically erasable programmable read-only memory), a FLASH-EEPROM, any other memory chip or cartridge, or any other medium from which a computer can read.

Various forms of computer readable media may be involved in carrying one or more sequences of one or more instructions to at least one processor for execution. For example, the instructions may initially be borne on a magnetic disk of a remote computer (not shown). The remote computer can load the instructions into its dynamic memory and send the instructions over an Ethernet connection, cable line, or telephone line using a modem. A communications device local to a computing device (e.g., a server) can receive the data on the respective communications line and place the data on a system bus for at least one processor. The system bus carries the data to main memory, from which the at least one processor retrieves and executes the instructions. The instructions received by main memory may optionally be stored in memory either before or after execution by the at least one processor. In addition, instructions may be received via a communication port as electrical, electromagnetic or optical signals, which are exemplary forms of wireless communications or data streams that carry various types of information.

The computerized system 10 provides for a reusable activity-function engine 11 that simplifies the implementation of an event-driven application 12 by encapsulating the responsibility of maintaining and executing the correct call order of sequential activity-functions 16 for multiple states of multiple programmable objects 14 for multiple input-events 20. This advantageously eases maintenance and modification of the application 12 by removing event-handling code from the main body of the application 12 and by enabling the application 12 to focus on application specific functionalities and activities.

As discussed above, the activity-function engine 11 may also be located in a separate file, programming module, or external library from the main body of the application 12. This may allow the activity-function engine 11 to be incorporated into future or other event-driven applications, thus shortening development time.

The computerized system 10 also removes the need to incorporate multiple conditional checks and filtering layers in the event-driven application 12 before the input-event 20 is handled by allowing the application 12 to add and remove input-event to activity-function mappings 22 from the event-matching list 18 prior to the triggering of an input-event 20. The activity-function engine 11 may quickly locate the mapped activity-functions 16 using the even-matching list 18. Additionally, since the activity-function engine 11 is relied on for execution of the matched at least one activity-function 16, the application 20 need not be concerned with the current state of the at least one programmable object 14 at the time an input-event 20 is triggered.

The computerized system 10 may also provide the application 12 with improved control and flexibility by allowing the application 12 to directly control the execution order 26 of the activity functions 16 by rewriting the execution order 26 for the input-event to activity function mappings 22 in the activity-function engine 11. The application 12 may also advantageously control the flow of the execution of the activity-functions 16 through the feedback code 34 returned by the activity-functions 16 upon execution.

Although this invention has been shown and described with respect to the detailed embodiments thereof, it will be understood by those skilled in the art that various changes in form and detail thereof may be made without departing from the spirit and the scope of the invention.

What is claimed is:

1. A computerized system comprising:
an activity-function engine including an event matching list having a plurality of input-event to activity-function mappings, the activity-function engine configured to execute on at least one processor; and
an application configured to be stored in memory and executed by the at least one processor, the application including at least one programmable object having at least one activity function;
wherein the activity-function engine is configured to receive an input-event from the application, to match the input-event to the at least one activity-function based on the plurality of input-event to activity-function mappings, and to execute the at least one activity-function.

2. The computerized system according to claim 1, wherein the activity-function engine is configured to execute multiple activity-functions matching the input-event in a defined execution order.

3. The computerized system according to claim 1, wherein the at least one activity-function is configured to return a feedback code.

4. The computerized system according to claim 3, wherein the feedback code is a SUCCESS code when the at least one activity-function successfully executes, a PARTIAL-SUCCESS code when the at least one activity-function successfully executes and at least one additional activity-function does not execute due to unavailability of a programmable object of the at least one programmable object having the at least one additional activity function, a NO-MATCH code when the at least one input event does not match any activity functions, a FAIL code when the at least one activity-function encounters an error, a BREAK code when subsequent activity-functions matching the input-event are not to be executed, or a RERUN code when the activity-function engine is to process the input-event an additional time.

5. The computerized system according to claim 1, wherein the input-event includes a unique event identifier.

6. The computerized system according to claim 5, wherein the unique event identifier comprises:
an event type identifier defining a category of input-event;
an object identifier defining a specific programmable object of the at least one programmable object; and
an event identifier defining a specific input-event.

7. The computerized system according to claim 6, wherein the unique event identifier is in packed form.

8. A computerized method comprising the steps of:
receiving, at an activity-function engine, an input-event from an application;
matching, at the activity-function engine, the input-event to at least one activity-function of at least one programmable object of the application based on an event matching list comprising a plurality of input-event to activity-function mappings; and
executing the at least one activity-function.

9. The computerized method according to claim 8, wherein the step of executing the at least one activity-function includes executing the at least one activity-function in a defined execution order.

10. The computerized method according to claim 8, additionally comprising the step of:
returning a feedback code by the at least one activity-function.

11. The computerized method according to claim 10, wherein the feedback code is a SUCCESS code when the at least one activity-function successfully executes, a PARTIAL-SUCCESS code when the at least one activity-function successfully executes and at least one additional activity-function does not execute due to unavailability of a programmable object of the at least one programmable object having the at least one additional activity function, a NO-MATCH code when the at least one input event does not match any activity functions, a FAIL code when the at least one activity-function encounters an error, a BREAK code when subsequent activity-functions matching the input-event are not to be executed, or a RERUN code when the activity-function engine is to process the input-event an additional time.

12. The computerized method of claim 8, wherein matching, at the activity-function engine, the input-event to at least one activity-function of at least one programmable object of the application is based on a unique event identifier of the input-event.

13. The computerized method according to claim 12, wherein the unique event identifier comprises:
   an event type identifier defining a category of input-event;
   an object identifier defining a specific programmable object of the at least one programmable object; and
   an event identifier defining the input-event.

14. The computerized method according to claim 13, wherein the unique event identifier is in packed form.

15. A non-transitory, tangible computer-readable medium storing instructions adapted to be executed by a computer processor to perform a method comprising the steps of:
   receiving, at an activity-function engine, an input-event from an application;
   matching, at the activity-function engine, the input-event to at least one activity-function of at least one programmable object of the application based on an event matching list comprising a plurality of input-event to activity-function mappings; and
   executing the at least one activity-function.

16. The non-transitory, tangible computer-readable medium of claim 15, wherein the step of executing the at least one activity-function includes executing the at least one activity-function in a defined execution order.

17. The non-transitory, tangible computer-readable medium of claim 15, additionally comprising the step of:
   returning a feedback code by the at least one activity-function.

18. The non-transitory, tangible computer-readable medium of claim 17, wherein the feedback code is a SUCCESS code when the activity-function successfully executes, a PARTIAL-SUCCESS code when the at least one activity-function successfully executes and at least one additional activity-function does not execute due to unavailability of a programmable object of the at least one programmable object having the at least one additional activity function, a NO-MATCH code when the at least one input event does not match any activity functions a FAIL code when the activity-function encounters an error, a BREAK code when subsequent activity-functions matching the input-event are not to be executed, or a RERUN code when the activity-function engine is to process the input-event an additional time.

19. The non-transitory, tangible computer-readable medium of claim 15, wherein matching, at the activity-function engine, the input-event to at least one activity-function of at least one programmable object of the application is based on a unique event identifier of the input-event.

20. The non-transitory, tangible computer-readable medium of claim 19, wherein the unique event identifier comprises:
   an event type identifier defining a category of input-event;
   an object identifier defining a specific programmable object of the at least one programmable object; and
   an event identifier defining the input-event.

* * * * *